United States Patent
Al-Sannaa

(10) Patent No.: US 8,182,702 B2
(45) Date of Patent: May 22, 2012

(54) NON-SHEDDING STRAINER

(75) Inventor: Muhsen Shobbar Hashim Al-Sannaa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 12/317,509

(22) Filed: Dec. 24, 2008

(65) Prior Publication Data
US 2010/0155345 A1    Jun. 24, 2010

(51) Int. Cl.
  *B01D 37/00*    (2006.01)
  *B01D 35/02*    (2006.01)
(52) U.S. Cl. ............... 210/806; 210/448; 210/497.3
(58) Field of Classification Search ............... None
  See application file for complete search history.

(56) References Cited

U.S. PATENT DOCUMENTS

| | | | | |
|---|---|---|---|---|
| 4,386 A | * | 2/1846 | Jennison | 210/449 |
| 381,990 A | * | 5/1888 | Driller | 210/318 |
| 427,447 A | * | 5/1890 | Thomson | 210/449 |
| 470,192 A | * | 3/1892 | Gross | 210/449 |
| 513,215 A | * | 1/1894 | Strater | 210/477 |
| 557,075 A | * | 3/1896 | Langer | 210/306 |
| 711,535 A | * | 10/1902 | Scholl | 210/433.1 |
| 730,356 A | * | 6/1903 | Emond | 210/306 |
| 744,060 A | * | 11/1903 | Frye | 210/239 |
| 746,949 A | * | 12/1903 | Gardener | 210/497.3 |
| 751,918 A | | 2/1904 | Jagger | |
| 1,115,016 A | * | 10/1914 | Phells | 220/484 |
| 1,144,306 A | * | 6/1915 | Mock | 181/279 |
| 1,389,401 A | * | 8/1921 | Van Nostrand et al. | 210/484 |
| 1,573,067 A | | 2/1926 | Holland | |
| 1,704,634 A | * | 3/1929 | Snider | 210/445 |
| 1,706,400 A | * | 3/1929 | Diamond | 210/323.2 |
| 1,855,904 A | * | 4/1932 | Brown et al. | 210/422 |
| 2,028,520 A | * | 1/1936 | Phillips | 210/300 |
| 2,257,944 A | * | 10/1941 | Fischbein | 210/497.3 |
| 2,491,796 A | * | 12/1949 | Baume | 210/448 |
| 2,505,114 A | * | 4/1950 | Hayman et al. | 241/37.5 |
| 2,732,946 A | * | 1/1956 | Schaub | 210/459 |
| 2,779,478 A | * | 1/1957 | Wahlin | 210/232 |
| 2,802,574 A | * | 8/1957 | Schweppe | 210/369 |
| 3,109,459 A | * | 11/1963 | Lee, II | 138/40 |
| 3,165,166 A | | 1/1965 | Hall | |
| 3,245,540 A | * | 4/1966 | Johnson | 210/291 |

(Continued)

OTHER PUBLICATIONS

Technical Paper: Roman W. Motriuk: "A Perforated Connical Strainer as an Example of an Acoustic Noise Generator", Copyright 2003, pp. 185-191.

*Primary Examiner* — Robert James Popovics
(74) *Attorney, Agent, or Firm* — Abelman, Frayne & Schwab

(57) ABSTRACT

A strainer is disclosed for filtering a flow stream passing therethrough, while reducing vortex shedding and related minimizing noise and vibration. The strainer includes an elongated member which defines a generally longitudinal axis, and having an opening at one end and a closed end at the opposite end. The opening has a greater dimension than the closed end. The elongated member includes a plurality of rows of apertures located between the opening and the closed end, with the apertures of each row being of generally equal dimension and located in a plane generally perpendicular to the longitudinal axis. The pluralities of rows of apertures are of distinct dimensions and form a semi-random pattern such that a flow stream passing therethrough causes distinct frequencies associated with each row, which frequencies generally reduce or cancel any pulsation resulting therefrom.

18 Claims, 3 Drawing Sheets

U.S. PATENT DOCUMENTS

| | | | |
|---|---|---|---|
| 3,292,733 A | 12/1966 | Everett et al. | |
| 3,450,207 A | 6/1969 | Hirsch | |
| 3,583,455 A * | 6/1971 | Ostrowsky | 241/95 |
| 3,731,815 A | 5/1973 | Collingwood et al. | |
| 3,762,654 A | 10/1973 | Haslett et al. | |
| 3,856,049 A * | 12/1974 | Scull | 138/42 |
| 3,874,234 A * | 4/1975 | Burgess | 73/861.22 |
| 3,912,638 A * | 10/1975 | Beaubien | 210/455 |
| 4,003,836 A * | 1/1977 | Stearns et al. | 210/247 |
| 4,135,899 A * | 1/1979 | Gauer | 55/482 |
| 4,150,696 A * | 4/1979 | Meier et al. | 138/44 |
| 4,151,955 A * | 5/1979 | Stouffer | 239/11 |
| 4,171,643 A * | 10/1979 | Frick | 73/861.24 |
| 4,198,220 A * | 4/1980 | Keller | 55/442 |
| 4,226,279 A * | 10/1980 | Eisinger et al. | 165/134.1 |
| 4,278,455 A * | 7/1981 | Nardi | 55/337 |
| 4,418,722 A * | 12/1983 | Kendall et al. | 138/42 |
| 4,495,073 A | 1/1985 | Beimgraben | |
| D279,379 S * | 6/1985 | Uram | D15/138 |
| 4,582,605 A | 4/1986 | Rea et al. | |
| 4,691,894 A * | 9/1987 | Pyotsia et al. | 251/127 |
| 4,758,256 A | 7/1988 | Machado | 55/498 |
| 4,839,038 A | 6/1989 | McLain, II | |
| 4,849,105 A * | 7/1989 | Borchert | 210/408 |
| 4,860,669 A * | 8/1989 | Collins et al. | 110/165 R |
| 5,015,171 A * | 5/1991 | Zinn et al. | 431/1 |
| 5,101,930 A | 4/1992 | Fargo et al. | |
| 5,127,173 A * | 7/1992 | Thurston et al. | 73/202 |
| 5,127,274 A * | 7/1992 | Lew | 73/861.24 |
| 5,132,013 A * | 7/1992 | Thompson | 210/448 |
| 5,197,455 A | 3/1993 | Tessien | |
| 5,300,224 A * | 4/1994 | Farley | 210/266 |
| 5,402,964 A * | 4/1995 | Wygnanski | 244/1 N |
| 5,500,115 A | 3/1996 | Nehm et al. | |
| 5,521,340 A | 5/1996 | Thawani et al. | |
| 5,588,635 A * | 12/1996 | Hartman | 251/127 |
| 5,596,152 A * | 1/1997 | Bergervoet et al. | 73/861.83 |
| 5,762,107 A * | 6/1998 | Laws | 138/44 |
| 5,888,260 A * | 3/1999 | Sica | 55/331 |
| 5,897,787 A * | 4/1999 | Keller | 210/767 |
| 5,916,435 A * | 6/1999 | Spearman et al. | 210/132 |
| 6,000,433 A * | 12/1999 | Carroll et al. | 138/41 |
| 6,014,987 A * | 1/2000 | List et al. | 137/549 |
| 6,135,375 A * | 10/2000 | Kaposi et al. | 241/95 |
| 6,145,544 A * | 11/2000 | Dutertre et al. | 138/39 |
| 6,186,179 B1 * | 2/2001 | Hill | 138/39 |
| 6,318,564 B1 * | 11/2001 | Archibald et al. | 210/448 |
| 6,357,164 B1 * | 3/2002 | Safwat et al. | 43/9.1 |
| 6,374,531 B1 * | 4/2002 | Safwat et al. | 43/4.5 |
| 6,434,879 B1 * | 8/2002 | Safwat et al. | 43/9.95 |
| 6,468,427 B1 * | 10/2002 | Frey | 210/497.01 |
| 6,619,331 B1 * | 9/2003 | Suchdev | 138/177 |
| 6,619,887 B1 * | 9/2003 | Szewczyk et al. | 405/211 |
| 6,701,963 B1 * | 3/2004 | Hill | 138/39 |
| 6,732,468 B2 * | 5/2004 | Safwat et al. | 43/9.1 |
| 6,836,963 B2 * | 1/2005 | Wnuk et al. | 29/896.61 |
| 6,939,465 B2 * | 9/2005 | Dupre | 210/248 |
| 7,347,223 B2 * | 3/2008 | Richter | 138/37 |
| 7,380,348 B2 * | 6/2008 | Seebach | 34/326 |
| 7,473,359 B1 * | 1/2009 | Barrett, II | 210/232 |
| 2003/0178349 A1 * | 9/2003 | Bacon et al. | 210/94 |
| 2004/0031747 A1 * | 2/2004 | Dupre | 210/411 |
| 2004/0069704 A1 | 4/2004 | Yamaguchi et al. | |
| 2005/0017019 A1 * | 1/2005 | Richter | 222/1 |
| 2007/0215226 A1 * | 9/2007 | Richter | 138/37 |

* cited by examiner

NON-SHEDDING STRAINER

BACKGROUND OF THE INVENTION

1. Field of the Invention

The present invention relates to a strainer for filtering a flow stream of liquid or gas passing therethrough.

2. Description of the Related Art

A filtering strainer which retains larger pieces while permitting smaller pieces and liquids to pass therethrough has many applications. In particular, a strainer can be utilized in the oil and gas industries where it is installed upstream of rotating equipment such as gas compressors or pumps to protect the internal components from being damaged due to carried over solid objects.

The use of a strainer for straining a fluid flow is well known. One example of a strainer is disclosed in U.S. Pat. No. 4,839,038 to McLain, II which relates to a fluid strainer and flow corrector for use with a fluid flow measurement device such as a turbine-type flow meter.

Another example of a strainer is illustrated in U.S. Pat. No. 5,500,115 to Nehm, et al.

Conventional strainers are known for generating pressure pulsation in association with vortex shedding and/or eddies due to the stream flow of liquid or gas passing through them. In some cases, the pressure pulsation could coincide with a system's natural frequencies and cause serious damage to the system. In other cases, the pressure pulsation may cause piping vibrations, damage rotating equipment internals, and result in associated high level noise as well as high pressure drop. For instance, vibrations created by the vortices can cause cracks in the strainer mounting parts.

One of the previous approaches was to remove the strainer, which is not acceptable because it will leave internal components such as a compressor without protection against foreign objects. Another approach was to relocate the strainer, which is not practical and did not solve the root case nor resolve the noise issue. Yet another approach was to change the angle of inclination for the strainer, which fails to prevent the pressure pulsation problem. Some other designs of strainers purporting to reduce vibration are flawed by their inherent design. Due to these necessary constraints, they could not be manufactured with a large enough size to be usable in many industries, making those solutions not viable.

Thus, a strainer is needed that can filter a flow stream passing therethrough, while reducing vortex shedding and related noise and vibrations. Such strainer would solve the root cause and not be sensitive to location of the strainer in piping machinery.

SUMMARY OF THE INVENTION

A primary feature of the preferred embodiment of the present invention, which will be described subsequently in greater detail, is to provide a strainer or the like for filtering a passing flow stream, which has many of the advantages over presently known strainers heretofore. A feature of the present invention also provides many novel features that result in a new strainer which overcomes the shortcomings of, and is not anticipated, rendered obvious, suggested, implied or even predicted by any of the known strainers, either alone or in any combination.

To attain this objective, a primary feature of the preferred embodiment generally provides a strainer that includes an elongated member defining a generally longitudinal axis, and having an opening at one end and a closed end at the opposite end. Another feature of the preferred embodiment is that the opening is generally circular and of greater dimension than the closed end, and the elongated member has a generally tapered conical configuration. The closed end has a generally arcuate shape to reduce the passing flow stream at a downstream location.

Another feature of the preferred embodiment is to provide an improved strainer with the plurality of rows that includes a first row of apertures of a predetermined dimension, a second row of apertures located adjacent the first row, each aperture of the second row having a dimension less than the dimension of the apertures of the first series, at least one of the first row and the second row causing the passing flow stream to produce a pressure pulsation of a first frequency. The preferred embodiment of the invention also features a third row of apertures located adjacent the second row and defining a third series of apertures of dimension at least equal to or greater than the dimension of the apertures of the second series, and a fourth row of apertures located adjacent the third row and defining a fourth series of apertures of a dimension at least equal to or greater than the dimension of the apertures of the third series, at least one of the third and fourth rows causing the passing flow stream to produce a pressure pulsation of another frequency that at least substantially reduces, or even nullifies the pressure pulsation produced by the first frequency.

Still another feature is to provide an improved strainer with the plurality of rows further including a fifth row of apertures located adjacent the first row on the opposite side of the second row, and defining a fifth series of apertures of a dimension at least greater than the dimension of the apertures of the first series; and a sixth row of apertures located adjacent the fourth row and defining a sixth series of apertures of a dimension at least greater than or equal to the dimension of the apertures of the fourth series.

Still another feature is to provide a plurality of rows further including a seventh row of apertures located adjacent the fifth row of apertures and defining a seventh series of apertures of a dimension at least equal to or less than the dimension of the apertures of the fifth row, and an eighth row of apertures located adjacent the seventh row and defining an eighth series of apertures of a dimension at least equal to or less than the dimension of the apertures of the seventh series; and a ninth row located adjacent the eighth row and defining a ninth series of apertures of a dimension at least equal to or less than the dimension of the apertures of the eighth series. Another feature of the invention relates to the plurality of rows extending from the ninth row to the sixth row of apertures being repeated as a continuous arrangement between the opening and the closed end.

Another preferred feature is to provide an improved strainer with apertures in each of the plurality of rows formed with a dimension distinct from other apertures of the plurality of rows in a non-recurrent manner to define a random arrangement of the plurality of rows of apertures. Yet another feature of the invention relates to the rows being formed in a staggered manner such that a plane passing through the longitudinal axis will intercept alternate rows of apertures.

A method of using the non-shedding strainer of the invention is also disclosed.

Other objects, features and advantages of the present invention will become obvious to the reader, and it is intended that these objects, features and advantages are within the scope of the present invention.

To the accomplishment of the above and related objects, features and advantages, the present invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Preferred embodiments of the invention are described hereinbelow with reference to the drawings, wherein.

DETAILED DESCRIPTION OF THE PREFERRED EMBODIMENTS

Definitions:

Eddy, as discussed herein, is the swirling of a fluid and the reverse current created when the fluid flows past an obstacle. As the moving fluid creates a void on the downstream side of the object, fluid behind the obstacle flows into the void creating a swirl of fluid on each edge of the obstacle, followed by a short reverse flow of fluid behind the obstacle flowing upstream, toward the back of the obstacle.

Strainer, as discussed herein, is an apparatus of any size and application, that, in operation, retains larger pieces while passing through smaller pieces and liquids.

Vortex shedding, as discussed herein, is an unsteady flow that takes place in special flow velocities which is caused when air or liquid flows past a blunt object, creating alternating low pressure vortices on the downstream side of the object.

Gas compressor, as discussed herein, is a mechanical device that increases the pressure of a gas by reducing its volume. As gases are compressible, the compressor also reduces the volume of a gas. Most liquids are relatively incompressible, so the main action of a pump is to transport liquids.

Gas piping system, as discussed herein, is a piping mechanism that transports gas.

Pressure pulsation, as discussed herein, is used interchangeably with turbulence or turbulent flow to characterize chaotic, stochastic property changes in a fluid regime. This includes low momentum diffusion, high momentum convection, and rapid variation of pressure and velocity in space and time such as various eddies and vortices.

Figure 1:
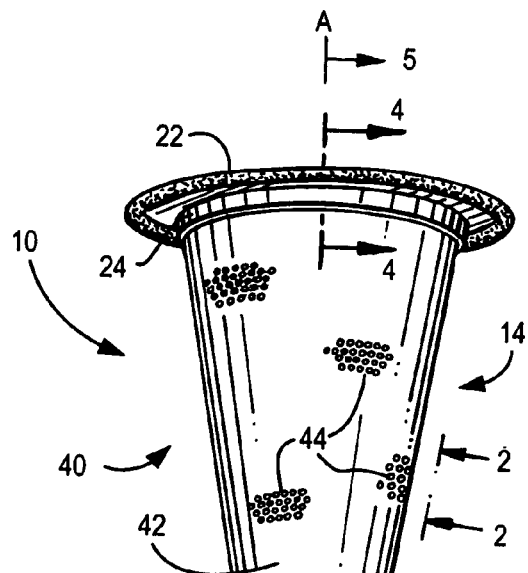
FIG. 1 is a front perspective view from below, of a strainer for filtering a flow stream which passes therethrough, according to a preferred embodiment of the invention.

Referring to the drawings, in which similar reference characters denote similar elements throughout the several views, the attached FIGS. illustrate a strainer for filtering a flow stream passing therethough, which is constructed according to a preferred embodiment of the invention. Referring initially to FIG. 1, the strainer 10 comprises an elongated member 14 having a generally tapered conical configuration and a flange-shaped support member 16 located at one of its ends, the overall structure defining a longitudinal axis A-A as shown in FIG. 1.

In this preferred embodiment, the elongated member 14 tapers toward a closed end 18 which is shaped as a conical nose tip 20. The conical nose tip 20 has a generally arcuate shape and is smooth and round to promote laminar flow at the tip end. Also, the rounded conical nose tip 20 has no structural discontinuities with the rest of the elongated member 14.

Figure 5:
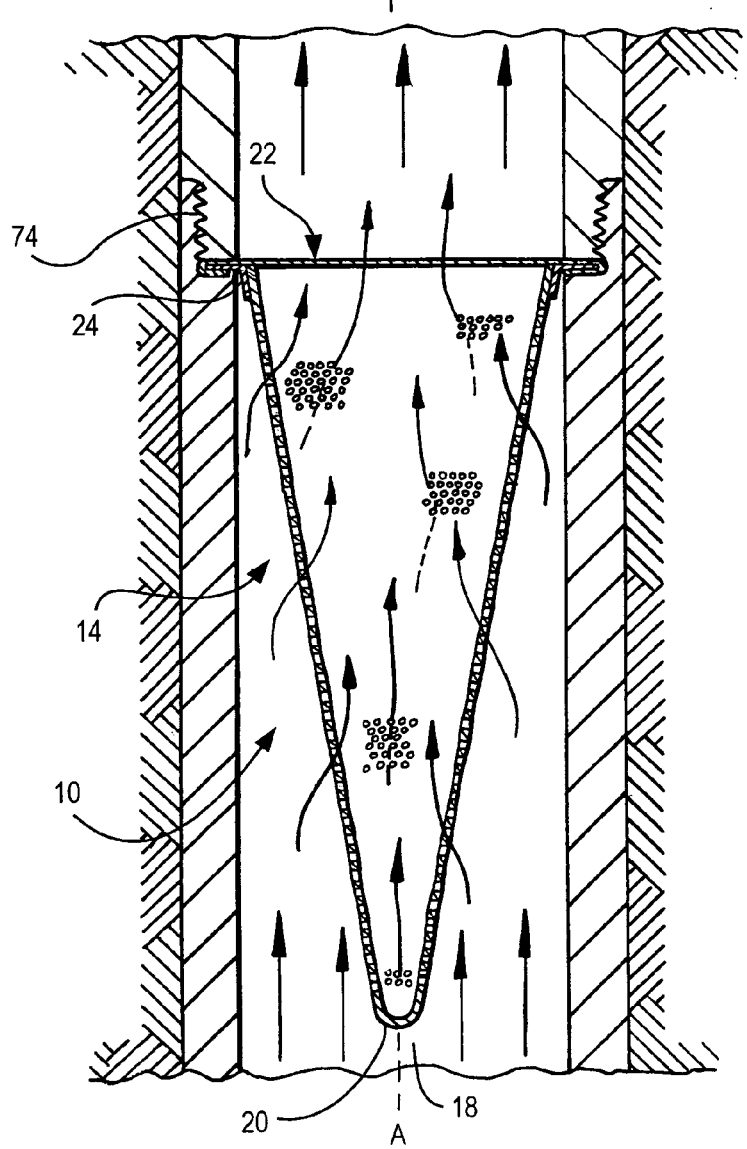
FIG. 5 is a cross-sectional view of the strainer of FIG. 1, taken along lines 5-5 of FIG. 1, and illustrating an installation in a typical pipe machinery system with the cone facing the direction of the flow stream which passes therethrough.

On the elongated member 14, an annular skirt edge 24 defines an opening 22, more clearly illustrated in FIG. 5, which is located at the distal end, which is located opposite the closed end 18. In most cases, this opening 22 has a dimension that correlates with the width dimension of the pipe machinery in which the strainer 10 is typically installed.

Figure 4:
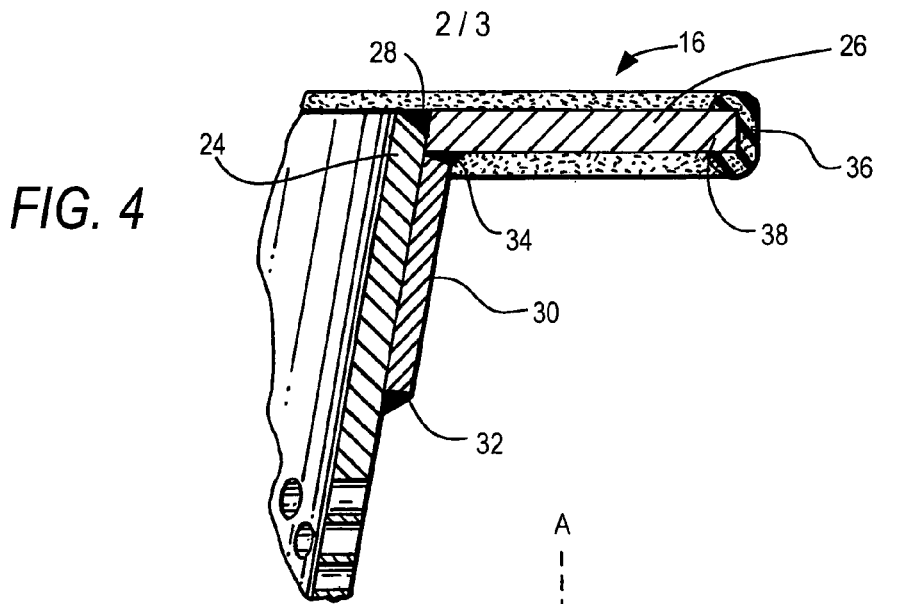
FIG. 4 is a cross-sectional view of the strainer of FIG. 1, taken along lines 4-4 of FIG. 1, and illustrating the support ring with its gasket, and a backing ring located at the upper end of the strainer.

Referring now to FIG. 4, the flange-shaped support member 16 is illustrated in a detailed cross-sectional view. FIG. 4 shows a support hoop 26 formed in an annular shape and being connected to the annular skirt edge 24 by weld 28. In addition, a strengthening unit such as a backingring 30 is fixed over the annular skirt edge 24 with weld 32, and also joined to the support hoop 26 by weld 34 as shown. This backing ring 30 provides additional strength to the support hoop 26 against possible damages, for instance, due to the pressure pulsation as discussed above. It will be readily apparent to those skilled in the art that the connection of the support hoop 26 with the elongated member 14 and other elements may be achieved by other means besides welding, including casting, fabrication, forging, grinding, machining, milling, tube bending, turning or the like.

FIG. 4 also illustrates an annular gasket 36 having a generally reverse-c-shaped (concave) cross-section. This gasket 36 is secured over the outer edge 38 of the support hoop 26. The gasket 36 can be made with any type of soft material such as a foam material, cork, or other gasket material, and provides an airtight sealing connection between the support hoop 26 and a mount 74 as shown in FIG. 5, on an installation site of the pipe machinery where the strainer is installed, so as to prevent the escape of gas or fluid.

Figure 2:
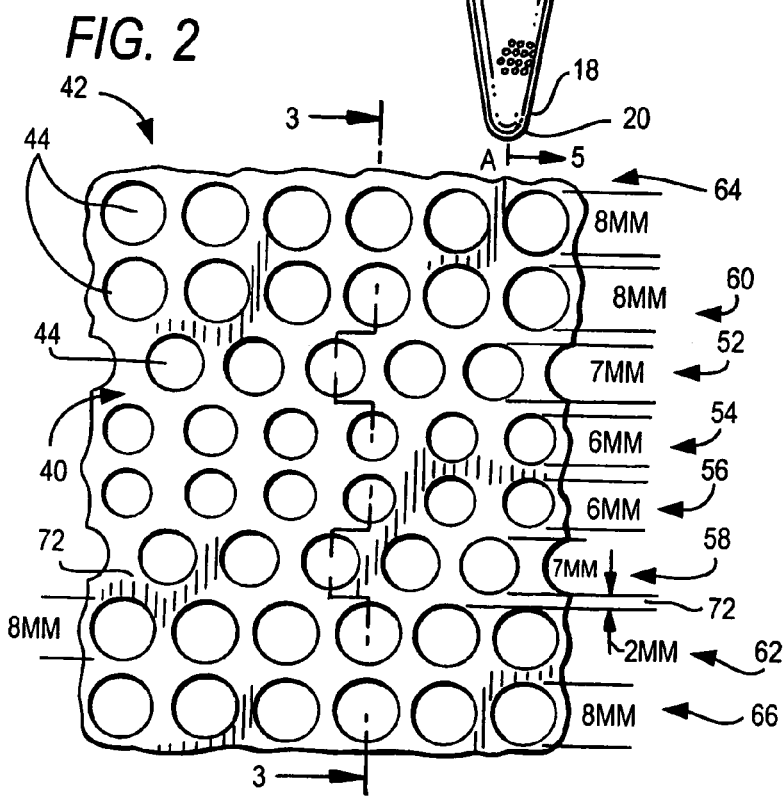
FIG. 2 is a view of a portion of the strainer of FIG. 1, taken along lines 2-2 of FIG. 1, and illustrating the plurality of apertures of different dimensions.
Figure 6:
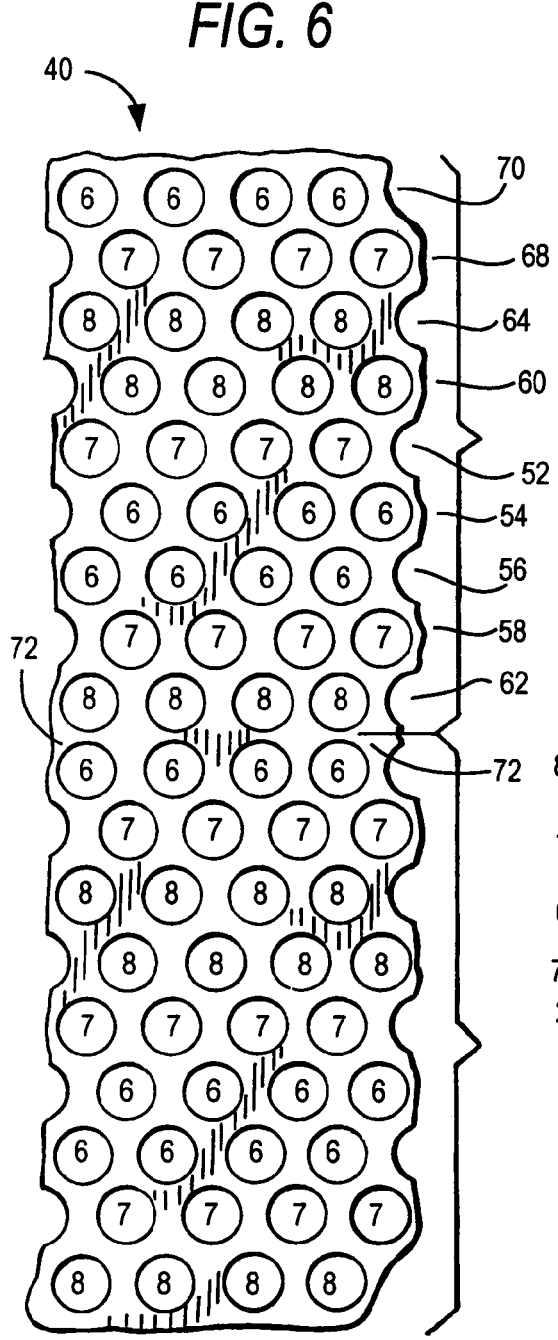
FIG. 6 is a cross-sectional view of another preferred embodiment of the invention, illustrating the plurality of apertures having alternative dimensions.
Figure 7:
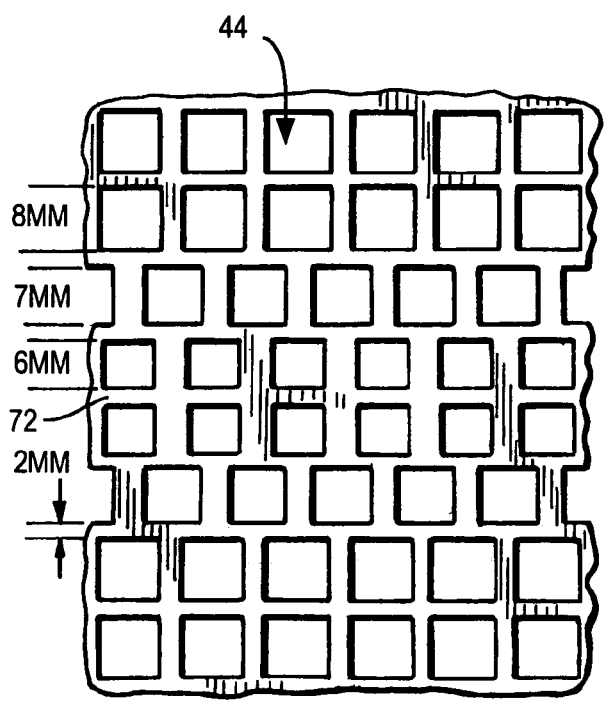
FIG. 7 is a cross-sectional view of yet another preferred embodiment of the invention, illustrating the plurality of apertures that are generally rectangular.

Referring again to FIG. 1, the elongated member 14 is defined by a screen plate 40 such as a mesh screen 42 of the types shown in FIGS. 2, 6 and 7. As can be seen in FIG. 2, the mesh screen 42 includes a plurality of apertures 44. Although the plurality of apertures 44 is shown discretely in FIG. 1, to avoid overly complicating the drawing, it will be readily apparent to those skilled in the art that the apertures are located throughout the elongated member 14, extending from near the conical nose tip 20 to the extent of the annular skirt edge 24 as shown in FIG. 4.

FIG. 2 illustrates the plurality of apertures 44 located on the screen plate 40 in a detailed cross-sectional view. As can be seen, the plurality of apertures 44 can be segregated into different rows, with each row of apertures being adjacent another row of apertures. As featured, apertures in certain rows have different dimensions from apertures of their adjacent rows. For instance, in the preferred embodiment shown in FIG. 2, each aperture of the plurality of apertures in a first row 52 has an inner dimension (or diameter) of 7 mm. The apertures in the second row 54 located adjacent the first row 52 have a dimension of 6 mm. The apertures in the third row

56 located adjacent the second row 54 have a dimension of 6 mm. The apertures in the fourth row 58 located adjacent the third row 56 have the dimension of 7 mm.

In this preferred embodiment, the apertures in the fifth row 60 located adjacent the first row 52 on the opposite side of the second row 54 have a dimension of 8 mm. A sixth row 62 is located adjacent the fourth row 58 and defines a sixth series of apertures having a dimension of 8 mm. As can be noted, the size differences of apertures for adjacent rows do not increase nor decrease continuously. For instance, the plurality of apertures at row 64 adjacent the fifth row 60 of apertures (with dimension of 8 mm) also have the dimension of 8 mm. Similarly, the apertures at row 66 adjacent the sixth row 62 of apertures (with dimension of 8 mm) also have the dimension of 8 mm.

The rows of apertures described above are separated from each adjacent row by approximately 2 mm spacing therebetween. Thus formed, the spacing 72 located between the rows of apertures define the boundary of each of the two adjacent rows of apertures.

As noted above, in this preferred embodiment, the aperture dimensions do not remain constant all throughout the screen plate 40. Additionally, the aperture dimension of each row neither increases nor decreases continuously through out all the rows. Instead, it will be readily apparent to those skilled in the art that the aperture dimensions of the preferred embodiment are provided as examples, and the aperture dimension vary in a random or semi-random pattern according to the present invention. For instance, the aperture dimensions for other embodiments may vary from 10 mm to 4 mm in a different row arrangement to define a semi-random aperture location pattern and so forth. In addition, it will also be readily apparent to those skilled in the art that, in another embodiment, the dimension of certain apertures in a particular row can vary from the dimensions of other apertures in that same row. In another embodiment, the plurality of apertures in each row may be located closer to the next adjacent row to define a staggered location of apertures such that a plane passing through the longitudinal axis 12 will intercept alternate rows of apertures 44. Further, in another embodiment, the location of apertures may not correlate into any definable rows and instead the apertures may be located on the screen plate 40 in a cluttered random configuration.

This special configuration (where the apertures 44 are of variable size and are arranged in a random or semi-random pattern) results in improved features for the strainer 10. For instance, in this preferred embodiment, when air or liquid flows through the apertures 44 in the first row 52 (or the second row 54), an unsteady flow creates alternating low pressure pulsation or vortices on the downstream side of the apertures 44. Vortices are generally present whenever there is stream flow over an obstruction. This set of vortices could lead to a larger problem when the generated vortices add up to each other and create a dominant single tuned vortex.

However, when air or liquid flows through the apertures 44 in the third row 56 (or the fourth row 58), the unsteady flow creates yet another low pressure pulsation or vortices with a different frequency. The variation in aperture dimension by one millimeter difference allows the generated vortices to be of different frequencies from the frequencies of the vortices created by the first and second rows (52, 54). As a result, the vortices generated by the stream flow with different frequencies will cancel each other. In other words, the second generated vortices will have different frequencies from the first generated vortices, and when they add up to each other, the vortices will prevent the creation of a dominant single tuned vortex. The semi-random pattern also ensures that no momentum coupling will occur between adjacent vortices with the same frequencies.

Figure 3:
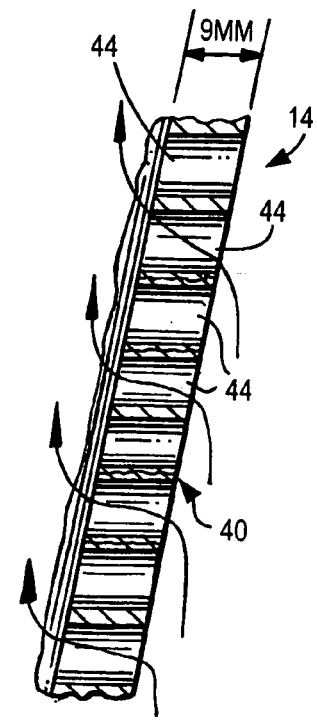
FIG. 3 is a cross-sectional view of the strainer of FIG. 1, taken along lines 3-3 of FIG. 2, and illustrating the depth of the apertures and the direction of the flow stream passing therethrough.

FIG. 3 illustrates the thickness of the elongated member 14, the depth of the apertures 44 located thereon, and the direction of the flow stream passing therethrough in a cross-sectional view. The apertures 44 extend through the depth of the screen plate 40 in a substantially perpendicular direction to its surface. The minimum thickness of the strainer is driven mostly by the size of the strainer. In this preferred embodiment, as used in gas industries, the thickness is preferably approximately 9 mm to ensure the structural strength and integrity of the strainer. In addition, the maximum thickness of the strainer is preferably approximately 12 mm to ensure the ease of fabrication and to avoid the production of a high pressure drop across the apertures 44 at a downstream.

The apertures 44 are located on the screen plate 40 in such a way that the flow stream passes through the apertures 44 in a generally perpendicular direction to the general flow stream direction. This placement of the apertures provides more surface area to the moving flow stream which also helps in reducing the pressure pulsation. Although not shown, a preferred configuration of the apertures 44 features smooth or round edges along the circular cut which defines each aperture. The curvilinear aperture edges aid in reducing the vortices. However, fabricating round apertures can be costly. It has been observed that when such strainers which do not have this feature, are installed in a flow stream system, the strainers functioned excellently. Accordingly, it was concluded that of the edges, while sometimes preferred, the roundness is not mandatory.

The preferred construction material for the strainer is stainless steel such as A304 or higher. Carbon steel is not as preferred as high alloy steel. However, other materials such as plastic, glass, or other types of material are also encompassed by the present invention.

FIG. 5 illustrates the preferred embodiment of the strainer 10 installed on a mount 74 in a pipe machinery with the opening 22 facing the flow stream direction (or the flow direction facing the conical nose tip 20) in a cross-sectional view. For reducing the vortex and other pressure pulsation, the strainer is generally installed with the orientation of its opening 22 facing opposite the flow direction as shown. However, from the functionality of protecting the downstream equipment, the strainer can also be installed with the orientation such that the conical nose tip 20 faces the flow direction. In other words, the strainer 10 can be oriented with the opening 22 facing the oncoming flow stream and still function as desired according to the present invention.

FIG. 6 illustrates yet another embodiment of the invention which can be incorporated into the elongated member 14 of FIG. 1. In this embodiment, the screen plate 40 includes the plurality of rows of apertures having a different series of dimensions in a cross-sectional view. In FIG. 6, the range of aperture dimensions range from 6 mm to 8 mm, and the defined semi-random row pattern for the rows of apertures 70, 68, 64, 60, 52, 54, 56, 58, and 62 are 6 mm, 7 mm, 8 mm, 8 mm, 7 mm, 6 mm, 6 mm, 7 mm, and 8 mm respectively. Further, this semi-random row pattern for the rows of apertures repeats after space 72 shown in FIG. 6, and continuously repeats the aforementioned pattern throughout the extent of the elongated member 14.

FIG. 7 illustrates yet another preferred embodiment of the invention in a cross-sectional view. As can be seen, each of the plurality of apertures 44 is generally rectangular. This configurational arrangement costs less to manufacture than the previous embodiments in a preferred size and dimension of the strainer 10 as used in gas and oil industries. The various dimensions of the apertures in this preferred embodiment range from 8 mm to 6 mm. The locations of the rows of apertures correspond to the row-location of the first embodiment described above. In general, the nominal aperture is dictated by the needs of the pressure drop control and filtration requirements to protect rotating equipment or any other sensitive equipment downstream of the flow. Although not shown, it will be readily apparent to those skilled in the art that, in addition to the circular or rectangular aperture shape described above, the aperture shape may also be hexagonal, oblique or any other design and still encompass the features of the present invention.

The preferred embodiment of the present invention provides several benefits. Generally, strainers are installed in pipe machinery upstream of the internal component to protect it from being damaged due to carried over solid objects. However, as described above, conventional strainers are known for generating pressure pulsation caused by vortex shedding. In addition, pressure pulsation could coincide with the machinery's natural frequencies and cause serious damage to the overall system.

The newly designed strainer shown in the several views reduces vortices by its configuration, its aperture dimensions, and the aperture locations and arrangements. For instance, the aperture dimensions of the strainer 10 of FIG. 1 varies by 1 (one) mm difference in the inside diameter of the apertures in the preferred embodiment where only three different aperture sizes are provided. Also, the semi-random row arrangement of the apertures ensures that apertures of the same size are not located in a repeating pattern. This newly designed strainer will protect the gas compressors or pump from being subject to pressure pulsation which can excite natural frequencies of the impeller, compressor rotor, piping system as well as acoustic natural frequencies of the system.

In addition, the round smooth characteristics of the conical nose tip 20 will enable the flow stream to pass the tip of the strainer smoothly; i.e., occurrence of eddies or vortices will be prevented at the tip. Also, because the conical nose tip 20 has no structural discontinuities with the rest of the elongated member 14, structural stress is minimized in that location (the location with repetitive failure in older designs). Further, the conical nose tip 20 together with thicker material enable the strainer 10 to have higher resistance to buckling which is another serious problem facing older designs with thin material. In addition, the tapered conical shape of the elongated member provides more area for stream flow passage further minimizing the pressure pulsation.

Therefore, the particular shape configuration, aperture dimension, and its arrangement ensure that the generated vortices from different aperture dimensions will cancel each other and the vortex shedding will not occur, resulting in a stream flow without pressure pulsation of any distinct frequency.

The new strainer can be utilized in the oil and gas industries where it is installed upstream of rotating equipments especially gas compressors or pumps. The particular fluid materials which are contemplated to be strained by the strainer include any gas service as well as liquid service. In this application, the type of apertures and flow conditions will generate frequencies in the range of 1500 Hz for gas service and around 500 Hz in liquid services. However, the present invention is not so limited to the oil and gas industries. For instance, the strainer can be utilized in power industries.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

The invention claimed is:

1. In a gas pipeline, the improvement comprising a strainer for filtering a gaseous flow stream passing therethrough, while reducing vortex shedding and related noise and vibration, which comprises:
   a) a generally conical elongated member defining a generally longitudinal axis, and having an opening at one end and a closed end at the opposite end, said elongated member having a plurality of rows of apertures located between said opening and said closed end, said apertures of each row being of dimension generally equal to the dimension of the remaining apertures in said row and being located in a plane generally perpendicular to said longitudinal axis, said plurality of rows of apertures including:
      i) a first row of apertures defining a first series of apertures of predetermined dimension;
      ii) a second row of apertures located adjacent said first row and defining a second series of apertures having a dimension less than the dimension of said apertures of said first series, at least one of said first and second rows of apertures causing a flow stream passing therethrough to produce a pressure pulsation of a first frequency;
      iii) a third row of apertures located adjacent said second row and defining a third series of apertures of dimension at least equal to or greater than the dimension of said apertures of said second series; and
      iv) at least a fourth row of apertures located adjacent said third row and defining a fourth series of apertures of dimension at least equal to or greater than the dimension of said apertures of said third row, at least one of said third and fourth rows causing the flow stream passing therethrough to produce a pressure pulsation of a second frequency that at least substantially reduces the pressure pulsation produced by the first frequency.

2. The strainer according to claim 1, wherein said closed end has a generally arcuate shape to reduce the eddy of the passing flow stream at a location downstream of said plurality of rows of apertures.

3. The strainer according to claim 2, wherein said apertures of each said series are of generally circular shape.

4. The strainer according to claim 3, wherein the diameter of each aperture of said second series is approximately 6 mm and the incremental diameter difference for other apertures having a dimension greater than the dimension of said second series of apertures generally increases by at least 1 mm and said difference of aperture dimensions is sufficient to cause the frequency produced by said second series of apertures to substantially nullify the pressure pulsation produced by the frequency produced by said first series of apertures.

5. The strainer according to claim 4, wherein each of said rows of apertures is separated from each adjacent row by approximately 2 mm.

6. The strainer according to claim 5, wherein said elongated member has a thickness of approximately 9 mm.

7. The strainer according to claim 6, wherein said plurality of rows of apertures further includes:
   a fifth row of apertures located adjacent said first row of apertures on the opposite side of said second row and defining a fifth series of apertures of a dimension at least greater than the dimension of said apertures of said first series; and at least a sixth row of apertures located adjacent said fourth row of apertures and defining a sixth series of apertures of a dimension at least greater than or equal to the dimension of said apertures of said fourth series.

8. The strainer according to claim 7, wherein said plurality of rows of apertures further includes:

a seventh row of apertures located adjacent said fifth row of apertures and defining a seventh series of apertures of a dimension at least equal to or less than the dimension of said apertures of said fifth row of apertures;

an eighth row of apertures located adjacent said seventh row of apertures and defining an eighth series of apertures of a dimension at least equal to or less than the dimension of said apertures of said seventh row of apertures; and at least a ninth row of apertures located adjacent said eighth row of apertures and defining a ninth series of apertures of a dimension at least equal to or less than the dimension of said apertures of said eighth row of apertures.

9. The strainer according to claim 8, wherein said plurality of rows of apertures extending from said ninth row to said sixth row of apertures is repeated as a continuous arrangement between said opening and said close end.

10. The strainer according to claim 9, wherein said rows of apertures are formed and positioned in a staggered manner such that a plane passing through the longitudinal axis of said elongated member will intercept alternate rows of apertures.

11. The strainer according to claim 8, wherein said elongated member is structured and adapted to be installed in a flow stream system with said closed end facing the direction of the flow stream.

12. The strainer according to claim 1, wherein said apertures in each of said plurality of rows are of a dimension distinct from said apertures of the next adjacent row to define a random arrangement of said plurality of rows.

13. The strainer according to claim 1, wherein said elongated member is structured and adapted to be installed in a flow stream system with said closed end facing the flow stream.

14. The strainer according to claim 1, wherein said apertures are generally rectangular.

15. A strainer for filtering a flow stream passing therethrough, while reducing vortex shedding and substantially minimizing related noise and vibration, which comprises:

a) a generally conical elongated member defining a generally longitudinal axis, and having an opening at one end and a closed end at the opposite end, said elongated member having a plurality of rows of apertures located between said opening and said closed end, said apertures of each row being of generally equal dimension and located in a plane generally perpendicular to said longitudinal axis, said plurality of rows of apertures including:

i) a first row of apertures, each said aperture being of about 6 mm in diameter;

ii) a second row of apertures, each said aperture being of about 7 mm in diameter, and located adjacent said first row;

iii) a third row of apertures, each said aperture being of about 8 mm in diameter, and located adjacent said second row;

iv) a fourth row of apertures, each said aperture being of about 8 mm in diameter, and located adjacent said third row;

v) a fifth row of apertures, each said aperture being of about 7 mm in diameter, and located adjacent said fourth row;

vi) a sixth row of apertures, each said aperture being of about 6 mm in diameter, and located adjacent said fifth row;

vii) a seventh row of apertures, each said aperture being of about 6 mm in diameter, and located adjacent said sixth row;

viii) an eighth row of apertures, each said aperture being of about 7 mm in diameter, and located adjacent said seventh row; and ix) at least a ninth row of apertures, each said aperture being of about 8 mm in diameter, and located adjacent said eighth row, wherein said rows of apertures cause a flow stream passing therethrough to produce at least two pressure pulsation frequencies which substantially nullify each other.

16. The non-shedding strainer according to claim 15, wherein said plurality of rows of apertures extending from said first row to said ninth row of apertures is repeated as a continuous arrangement between said opening and said closed end.

17. The non-shedding strainer according to claim 16, wherein said apertures in each of said plurality of rows of apertures are of a dimension distinct from said apertures of the next adjacent row to define a random arrangement of said plurality of rows of apertures.

18. A method for filtering a flow stream comprising:

a) positioning a strainer within a conduit, said strainer including:

i) an elongated member having a generally tapered conical configuration and defining a generally longitudinal axis, said elongated member having an opening at one end and a closed end at the opposite end; and ii) a plurality of rows of apertures defined by said elongated member, said plurality of apertures being located between said opening and said closed end, said apertures in each row being of generally equal dimension and located in a plane generally perpendicular to said longitudinal axis, said plurality of rows of apertures including:

1) a first row of apertures defining a first series of apertures of predetermined dimension;

2) a second row of apertures located adjacent said first row and defining a second series of apertures having a dimension less than the dimension of said apertures of said first series, at least one of said first and second rows of apertures causing a passing flow stream to produce a pressure pulsation of a distinct first frequency;

3) a third row of apertures located adjacent said second row and defining a third series of apertures of dimension at least equal to or greater than the dimension of said second series of apertures; and 4) at least a fourth row of apertures located adjacent said third row and defining a fourth series of apertures of dimension at least equal to or greater than the dimension of said third series of apertures of said third row; and b) passing a flow stream through said conduit and said strainer wherein a portion of said flow stream that passes through at least one of said third and fourth rows causes said flow stream portion to produce a pressure pulsation of a second distinct frequency that substantially nullifies any pressure pulsation produced by a portion of said flow stream that passes through at least one of said first and second rows of apertures producing said first distinct frequency thereby reducing vortex shedding and associated noise and vibration.

* * * * *